United States Patent
Kwon

(10) Patent No.: US 9,383,547 B2
(45) Date of Patent: Jul. 5, 2016

(54) IMAGING LENS

(75) Inventor: Dukkeun Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/122,828

(22) PCT Filed: Jun. 8, 2012

(86) PCT No.: PCT/KR2012/004563
§ 371 (c)(1),
(2), (4) Date: Nov. 27, 2013

(87) PCT Pub. No.: WO2012/169838
PCT Pub. Date: Dec. 13, 2012

(65) Prior Publication Data
US 2014/0098431 A1  Apr. 10, 2014

(30) Foreign Application Priority Data

Jun. 10, 2011 (KR) ........................ 10-2011-0056437

(51) Int. Cl.
*G02B 9/34* (2006.01)
*G02B 13/18* (2006.01)
*G02B 13/00* (2006.01)

(52) U.S. Cl.
CPC .............. *G02B 13/0015* (2013.01); *G02B 9/34* (2013.01); *G02B 13/004* (2013.01)

(58) Field of Classification Search
CPC ................................ G02B 9/34; G02B 13/004
USPC .................................. 359/715, 772, 708, 771
See application file for complete search history.

(56) References Cited

U.S. PATENT DOCUMENTS

| 7,466,497 B2 | 12/2008 | Park et al. |
| 7,643,225 B1 | 1/2010 | Tsai |
| 2002/0181121 A1 | 12/2002 | Kawakami |
| 2009/0109552 A1 | 4/2009 | You et al. |
| 2009/0128927 A1 | 5/2009 | Chen et al. |
| 2011/0058089 A1 | 3/2011 | Tang et al. |

FOREIGN PATENT DOCUMENTS

| CN | 1847907 A | 10/2006 |
| CN | 201319090 Y | 9/2009 |
| JP | 2002-228922 A | 8/2002 |
| JP | 2007-017984 A | 1/2007 |
| JP | 2009-098513 A | 5/2009 |

OTHER PUBLICATIONS

International Search Report in International Application No. PCT/KR2012/004563, filed Jun. 8, 2012.
Office Action dated Jul. 2, 2015 in Chinese Application No. 201280028517.0.
European Search Report dated Jan. 8, 2015 in European Application No. PCT/KR2012/004563.

*Primary Examiner* — William Choi
(74) *Attorney, Agent, or Firm* — Saliwanchik, Lloyd & Eisenschenk

(57) ABSTRACT

The present invention relates to an imaging lens, the imaging lens including, in an ordered way from an object side, a first lens having positive (+) refractive power, a second lens having negative (−) refractive power, a third lens having negative (−) refractive power, a fourth lens having negative (−) refractive power, wherein the imaging lens meets a conditional expression of $-0.5<f/f3<0$ and $-0.5<f/f4<0$, where f is an entire focus distance of the imaging lens, f3 is a focus distance of the third lens, and f4 is a focus distance of the fourth lens.

17 Claims, 3 Drawing Sheets

IMAGING LENS

CROSS-REFERENCE TO RELATED APPLICATIONS

This application is the U.S. national stage application of International Patent Application No. PCT/KR2012/004563, filed Jun. 8, 2012, which claims priority to Korean Application No. 10-2011-0056437, filed Jun. 10, 2011, the disclosures of each of which are incorporated herein by reference in their entirety.

TECHNICAL FIELD

The teachings in accordance with exemplary embodiments of this invention relate generally to an imaging lens.

BACKGROUND ART

Recently, vigorous research efforts are being made in the field of a mobile phone-purpose camera module, a digital still camera (DSC), a camcorder, and a PC camera (an imaging device attached to a person computer) all connected with an image pick-up system. One of the most important components in order that a camera module related to such an image pickup system obtains an image is an imaging lens producing an image.

Previously, there have been attempts to construct an imaging lens of high-resolution by using 5 pieces of lenses. Each of 5 pieces of lenses is comprised of lenses with a positive (+) refractive power and lenses with a negative (−) refractive power. For example, an imaging lens is constructed on a structure of PNNPN (+−−+−), PNPNN (+−+−−) or PPNPN (++−+−) in order starting from an object side. However, an imaging module of such a framework fails to show approving optic characteristics or aberration characteristics. Accordingly, a high-resolution imaging lens of a new power structure is required.

DISCLOSURE OF INVENTION

Technical Problem

Accordingly, embodiments of the present invention may relate to an imaging lens that substantially obviates one or more of the above disadvantages/problems due to limitations and disadvantages of related art, and it is therefore an object of the present invention to provide an optical system of compact and miniaturized imaging lens configured to compensate aberration and to realize a clear image.

Technical problems to be solved by the present invention are not restricted to the above-mentioned, and any other technical problems not mentioned so far will be clearly appreciated from the following description by skilled in the art.

Solution to Problem

In one general aspect of the present invention, there is provided an imaging lens, the imaging lens comprising in an ordered way from an object side: a first lens having positive (+) refractive power; a second lens having negative (−) refractive power; a third lens having negative (−) refractive power; a fourth lens having negative (−) refractive power, wherein the imaging lens meets a conditional expression of $-0.5 < f/f3 < 0$ and $-0.5 < f/f4 < 0$, where f is an entire focus distance of the imaging lens, f3: a focus distance of the third lens, and f4 is a focus distance of the fourth lens.

Preferably, but not necessarily, an object side surface of the first lens is convexly formed.

Preferably, but not necessarily, a front distal end of the object side surface of the first lens is positioned with a separate aperture.

Preferably, but not necessarily, the first lens takes a meniscus form convexly formed at an object side surface or takes a convexly formed at both sides.

Preferably, but not necessarily, the second lens is concavely formed at an upper side surface, and takes a meniscus form.

Preferably, but not necessarily, the third lens is concavely formed at an upper side surface, and takes a meniscus form.

Preferably, but not necessarily, the fourth lens is convexly formed at an object side surface, and takes a meniscus form.

Preferably, but not necessarily, the imaging lens meets a conditional expression of $0.5 < f1/f < 1.5$, where f is an entire focus distance of the imaging lens, and f1: a focus distance of the first lens.

Preferably, but not necessarily, the imaging lens meets a conditional expression of $0.5 < \Sigma T/f < 1.5$, where f is an entire focus distance of the imaging lens, and $\Sigma T$ is a distance from an object side surface of the first lens to an image-forming surface.

Preferably, but not necessarily, the imaging lens meets a conditional expression of $10 < [(v1+v3)/2-v2] < 20$ and $v3 < 30$ or, $10 < [(v1+v4)/2-v2] < 20$ and $v4 < 30$, where V1, V2, V3 and V4 are Abbe's numbers of the first to fourth lenses.

Preferably, but not necessarily, the imaging lens meets a conditional expression of $20 < V2 < 30$, where V2 is an Abbe's number of the second lens.

Advantageous Effects of Invention

The imaging lens according to the present invention has advantageous effects in that an optical system of compact and miniaturized imaging lens can be configured to compensate aberration and to realize a clear image by constructing the imaging lens with 4 pieces of lenses comprised of first, second, third and fourth lenses.

BEST MODE FOR CARRYING OUT THE INVENTION

Figure 1:
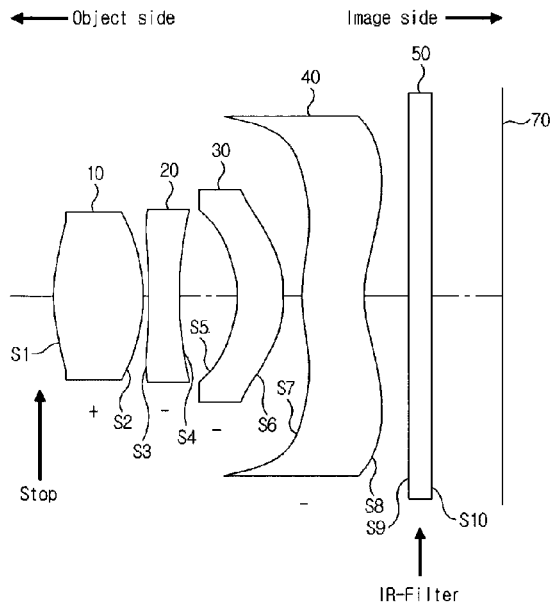
FIG. 1 is a constructional view illustrating a camera module lens according to the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thus," "then," "next," "therefore", etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the imaging lens according to exemplary embodiments of the present invention will be described in detail with reference to the accompanying drawings.

FIG. 1 is a constructional view illustrating an imaging lens according to an exemplary embodiment of the present invention.

The imaging lens comprised of a plurality of lenses is arranged about an optical axis (ZO), a thickness, size, and shape of each lens are rather overdrawn for description, and a spherical shape or an aspheric shape has been only presented as one exemplary embodiment, but obviously not limited to this shape.

Referring to FIG. 1, a camera lens module according to the present invention includes, in an ordered way from an object side, a first lens (10), a second lens (20), a third lens (30), a fourth lens (40), a filter (50) and a photo-detector (70). Light corresponding to image information of a subject is incident on the photo-detector (70) passing the first lens (10), the second lens (20), the third lens (30), the fourth lens (40) and the filter (50).

The imaging lens according to the present invention includes four pieces of lenses including the first lens (10), the second lens (20), the third lens (30) and the fourth lens (40), such that the imaging lens according to the present invention has an advantageous effect in that an optical system of compact and miniaturized imaging lens can be configured to compensate aberration and to realize a clear image. That is, the imaging lens according to the present invention can enhance resolution of lenses and to realize an excellent aberration characteristic.

Hereinafter, in the description of the construction of each lens, "object side surface" means the surface of a lens facing an object side with respect to an optical axis, "image side surface" means the surface of the lens facing an imaging surface with respect to the optical axis, and upper side surface means the surface of the lens a capturing surface with respect to an optical axis.

In the specification, "imaging" basically may refer to the process in which an imaging lens receives light from a subject in the field and outputs an image (image signal and image data) indicating the same. However, if the imaging lens is repeatedly generating the image indicating the subject in the field at a predetermined cycle, "imaging" may mean the process of storing a specific image out of the images generated by the imaging lens in a storage unit. In other words, from a certain standpoint, "imaging" may mean a process in which the imaging lens acquires an image indicating the content of the subject in the field and having the same in a state subjectable to the measurement process at a certain intended timing.

The first lens (10) has positive (+) refractive power, and takes a meniscus form convexly formed at an object side surface (S1) or takes a convexly formed at both sides. The second lens (20) has negative (−) refractive power, takes a concavely formed at an upper side surface (S4), and takes a meniscus form.

The third lens and fourth lenses (30, 40) have negative (−) refractive power, where the third lens (30) takes a concavely formed at an upper side surface (S6), and takes a meniscus form, and the fourth lens (40) takes a convexly formed at an object side surface (S7), and takes a meniscus form.

For reference, 'S1' in FIG. 1 is an object side surface of the first lens (10), 'S3' is an object side surface of the second lens (20), 'S5' is an upper side surface of the third lens (30), 'S8' is an upper side surface of the fourth lens (40), and 'S9' and 'S10' are an object side surface and an upper side surface of the filter (50) respectively. The filter (50) may be at least any one filter consisting of optical filters including an infrared filter and a cover glass.

In a case an infrared filter is employed as the filter (50), the infrared filter interrupts radiant heat emitted from an outside light from being transmitted to the photo-detector (70). Furthermore, the infrared filter transmits visible light and reflects infrared rays to output it to the outside. The photo-detector

(70) is an image sensor, for example, CCD (Charge Coupled Device) or CMOS (Complementary Metal Oxide Semiconductor), etc.

Because the later-described conditional expressions and exemplary embodiments are preferred embodiments enhancing an effect of interaction, it would be obvious to those skilled in the art that the present invention is not necessarily comprised of the following conditions. For example, only by satisfying some conditions of later-described conditional expressions, the lens construction (framework) of the present invention may have an enhanced effect of interaction.

$0.5 < f1/f < 1.5$ [Conditional expression 1]

$-0.5 < f/f3 < 0$ [Conditional expression 2]

$-0.5 < f/f4 < 0$ [Conditional expression 3]

$0.5 < \Sigma T/f < 1.5$ [Conditional expression 4]

$10 < [(v1+v3)/2-v2] < 20$ and $v3 < 30$ [Conditional expression 5]

$10 < [(v1+v4)/2-v2] < 20$ and $v4 < 30$ [Conditional expression 6]

$20 < V2 < 30$, [Conditional expression 7]

where f is an entire focus distance of the imaging lens, f1 is a focal distance of the first lens, f3 is a focal distance of the third lens, f4 is a focal distance of the fourth lens, $\Sigma T$ is a distance from an object side surface of the first lens to an image-forming surface, and V1, V2, V3 and V4 are Abbe's numbers of the first to fourth lenses.

Conditional expression 1 specifies refractive power of the first lens (10), conditional expression 2 specifies refractive power of the second lens (20) and conditional expression 3 specifies refractive power of the fourth lens (40).

The first, second and fourth lenses (10, 20, 40) have refractive powers each having an appropriate compensation of spherical aberration and appropriate chromatic aberration according to the conditional expressions 1, 2 and 3. The conditional expression 4 specifies dimension of optical axis direction of the entire optical system, and it is a condition for ultra-small lens and a condition for appropriate aberration compensation.

Conditional expression 5 specifies Abbe's numbers of first, second and third lenses (10, 20, 30), conditional expression 6 specifies Abbe's numbers of first, second and fourth lenses (10, 20, 40), and conditional expression 7 specifies Abbe's numbers of the second lens (20). The specification of Abbe's number of each lens is a condition for better compensation of chromatic aberration.

Hereinafter, the action and effect of the present invention will be described with reference to a specific exemplary embodiment. Aspheric mentioned in a later-exemplary embodiment is obtained from a known Equation 1, and 'E and its succeeding number' used in Conic constant k and aspheric coefficient A, B, C, D, E, F indicates 10's power. For example, E+01 denotes 10.sup.1, and E-02 denotes 10.sup.-2.

$$Z = \frac{cY^2}{1+\sqrt{1-(1+K)c^2Y^2}} + AY^4 + BY^4 + CY^4 + DY^4 + EY^4 + FY^4 +$$ <Equation 1> where, z: distance from the lens's top-point to an optical axis direction, c: basic curvature of a lens, Y: distance towards a direction perpendicular to an optical axis, K: conic constant, and A, B, C, D, E, F: aspheric coefficients

EXEMPLARY EMBODIMENTS

The following Table 1 shows an exemplary embodiment matching the aforementioned conditional expressions.

TABLE 1

|  | Exemplary embodiments |
| --- | --- |
| f | 4.70 |
| f1 | 2.66 |
| f2 | -5.30 |
| f3 | -100 |
| f4 | -26.86 |
| v1 | 56 |
| v2 | 23 |
| v3 | 23 |
| v4 | 23 |

Referring to Table 1, it can be noted that f1/f is 0.566 that matches the conditional expression 1, and f/f3 is -0.047 that matches the conditional expression 2, and f/f4 is -0.175 that matches the conditional expression 3. Furthermore, (v1+v3)/2-v2 and (v1+v4)/2-v2 are 16.5 that matches conditional expressions 5 and 6.

The following Table 2 shows an exemplary embodiment which is a more detailed exemplary embodiment over that of Table 1.

TABLE 2

| Surface number | Curvature radius (R) | Thickness or distance (d) | Refractive index (N) |
| --- | --- | --- | --- |
| 1* | 2.59 | 1.13 | 1.53 |
| 2* | -2.67 | 0.08 |  |
| 3* | 18.73 | 0.40 | 1.63 |
| 4* | 5.63 | 0.73 |  |
| 5* | -1.42 | 0.59 | 1.63 |
| 6* | -1.69 | 0.24 |  |
| 7* | 2.05 | 0.80 | 1.63 |
| 8* | 1.55 | 0.56 |  |
| 11 | Infinity | 0.30 | 1.52 |
| 12 | Infinity | 0.92 |  |
| Image | Infinity | -0.01 |  |

The notation * in the above Table 2 and following Table 3, which is further written near the surface number indicates aspheric. The following Table 3 shows a value of aspheric coefficient of each lens in the exemplary embodiment of Table 2.

TABLE 3

| Surface number | k | A | B | C | D | E |
|---|---|---|---|---|---|---|
| 1* | −1.285829 | −0.190966E−01 | −0.394819E−02 | −0.385693E−01 | 0.355996E−01 | −0.182937E−01 |
| 2* | 0.000000 | −0.259418E−02 | −0.714423E−01 | 0.622356E−01 | −0.203601E−01 | 0.000000 |
| 3* | 0.000000 | 0.491874E−01 | −0.101676E+00 | 0.105635E+00 | −0.325552E−01 | 0.401520E−02 |
| 4* | 0.000000 | 0.467012E−01 | −0.61884E−01 | 0.438876E−01 | −0.256322E−01 | 0.853345E−02 |
| 5* | −6.244302 | −0.153530E+00 | 0.397260E−01 | 0.825494E−02 | −0.138099E−01 | −0.296371E−02 |
| 6* | −0.213250 | −0.733944E−01 | 0.859338E−01 | −0.402740E−01 | 0.168417E−01 | −0.194191E−02 |
| 7* | −8.564513 | −0.153708E+00 | 0.752687E−01 | −0.229787E−01 | 0.406615E−02 | −0.333722E−03 |
| 8* | −5.768881 | −0.782733E−01 | 0.263653E−01 | −0.619759E−02 | 0.802089E−03 | −0.472815E−04 |

Figure 2:
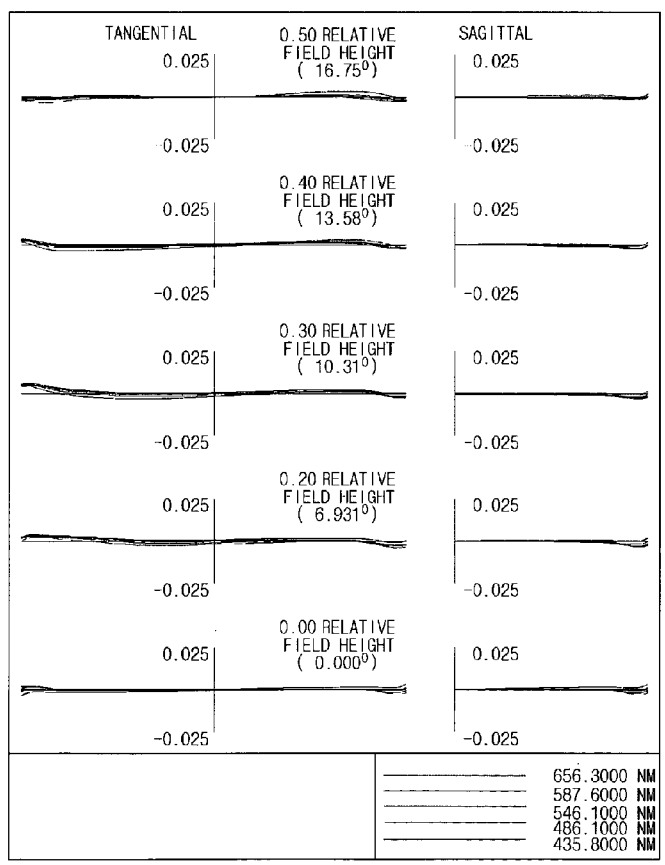
FIGS. 2 and 3 are graphs measuring coma aberrations according to an exemplary embodiment of the present invention.
Figure 3:
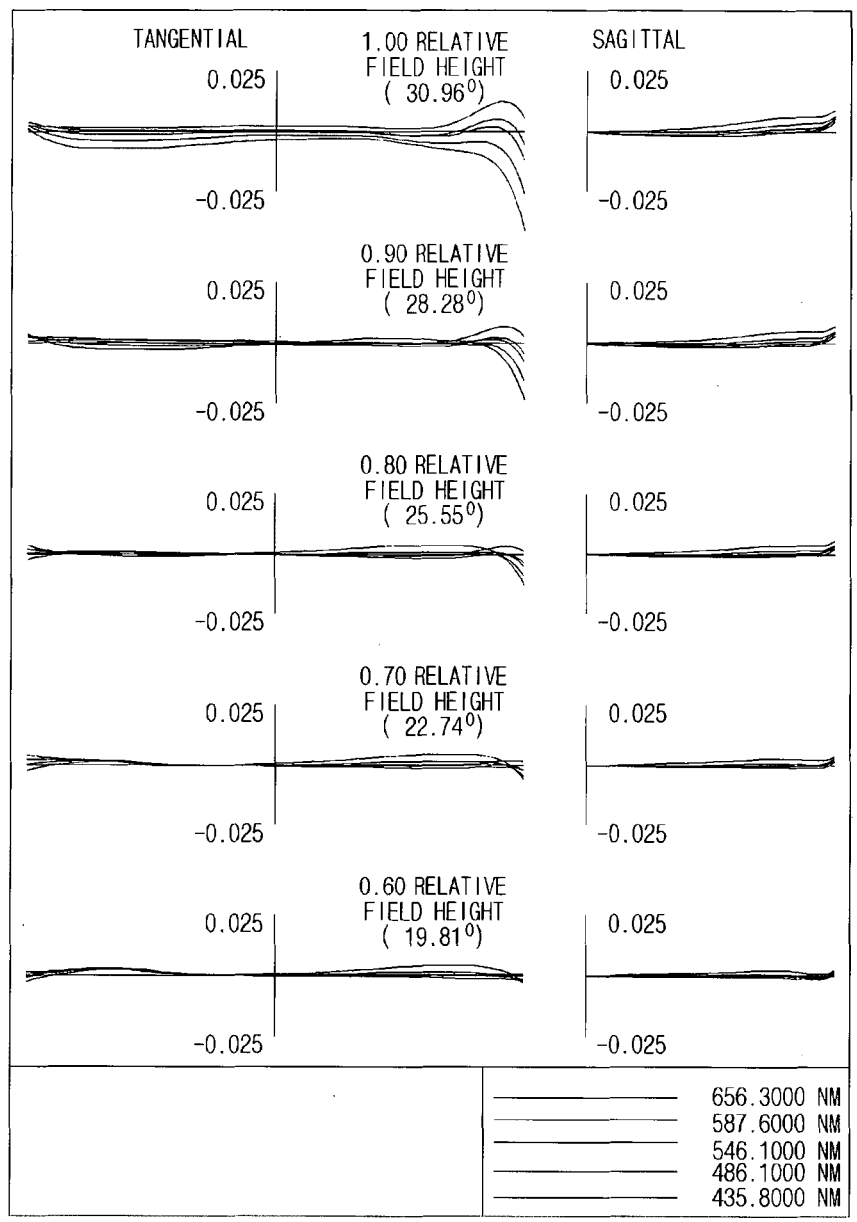

FIGS. 2 and 3, as graphs measuring coma aberration, are graphs measuring coma aberration according to exemplary embodiment of the present invention, where tangential aberration and sagittal aberration of each wavelength based on a field height are measured. In FIGS. 2 and 3, it is interpreted that a coma aberration correcting function is good as curves approach the X axis from a positive axis and a negative axis.

Figure 4:
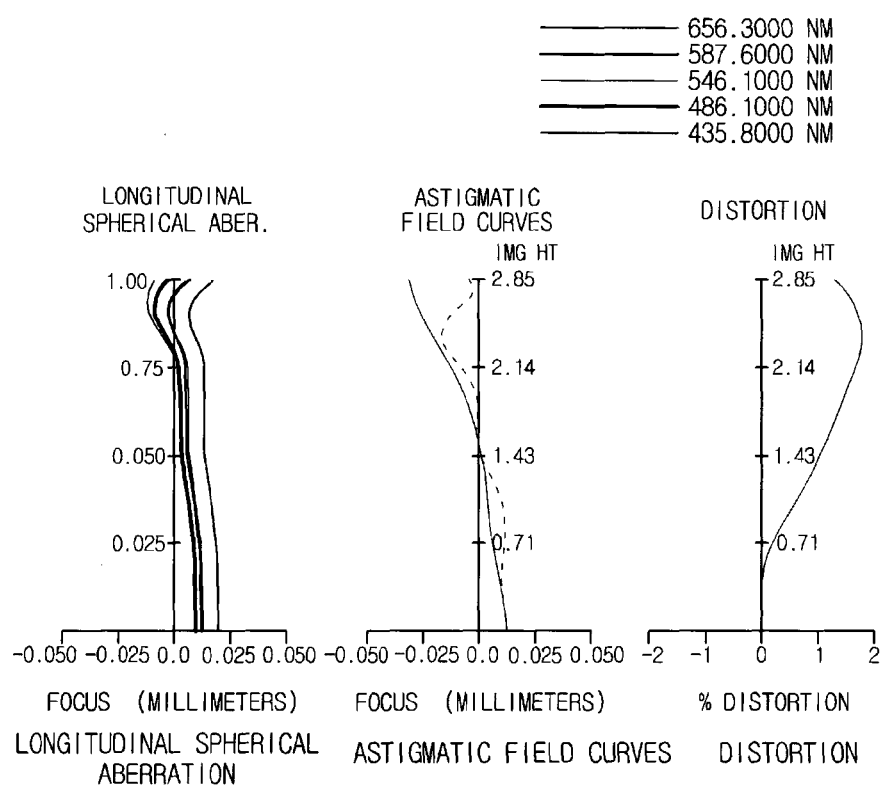
FIG. 4 is a graph measuring an aberration according to an exemplary embodiment of the present invention.

FIG. 4 is a graph illustrating aberration according to the exemplary embodiment of the present invention. That is, FIG. 4 is a graph measuring longitudinal spherical aberration, astigmatic field curves and distortion in order from left side. In FIG. 2, a Y axis means size of an image, and an X axis means focal distance (unit: mm) and distortion degree (unit: %). In FIG. 2, it is interpreted that an aberration correcting function is good as curves approach the Y axis. In the shown aberration diagram, because values of images in nearly all fields appear proximate to the Y axis, longitudinal spherical aberration, astigmatic field curves and distortion all demonstrate a superior figure.

That is, because scope of the longitudinal spherical aberration is −0.014 mm+0.020 mm, scope of astigmatic field curves is −0.032 mm~+0.013 mm, and scope of distortion is 0.00 mm~+1.70 mm, it can be noted that the imaging lens according to the present invention can correct longitudinal spherical aberration, astigmatic field curves and distortion and enhance the lens characteristics.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

As apparent from the foregoing, the imaging lens according to the exemplary embodiments of the present invention has an industrial applicability in that an optical system of compact and miniaturized imaging lens can be configured to compensate aberration and to realize a clear image by constructing the imaging lens with 4 pieces of lenses comprised of first, second, third and fourth lenses.

The invention claimed is:

1. An imaging lens, comprising in an ordered way from an object side:
a first lens having positive (+) refractive power;
a second lens having negative (−) refractive power;
a third lens having negative (−) refractive power; and
a fourth lens having negative (−) refractive power;
wherein the imaging lens meets a conditional expression of −0.5<f/f3<0 and −0.5<f/f4<0, where f is an entire focus distance of the imaging lens, f3: is a focus distance of the third lens, and f4 is a focus distance of the fourth lens;
wherein the imaging lens meets conditional expressions of:
a) 10<[(V1+V3)/2−V2]<20 and V3<30, and b) 10<[(V1+V4)/2−V2]<20 and V4<30; where V1, V2, V3, and V4 are Abbe's numbers of the first to fourth lenses, respectively; and
wherein the second lens is concavely formed at an image side surface, and takes a meniscus form.

2. The imaging lens of claim 1, wherein an object side surface of the first lens is convexly formed.

3. The imaging lens of claim 1, wherein a front distal end of the object side surface of the first lens is positioned with a separate aperture.

4. The imaging lens of claim 1, wherein the first lens takes a meniscus form convexly formed at an object side surface or is convexly formed at both sides.

5. The imaging lens of claim 1, wherein the third lens is convexly formed at an image side surface, and takes a meniscus form.

6. The imaging lens of claim 1, wherein the fourth lens is convexly formed at an object side surface, and takes a meniscus form.

7. The imaging lens of claim 1, wherein the imaging lens meets a conditional expression of 0.5<f1/f<1.5, where f is an entire focus distance of the imaging lens, and f1: a focus distance of the first lens.

8. The imaging lens of claim 1, wherein the imaging lens meets a conditional expression of 0.5<ΣT/f<1.5, where f is an entire focus distance of the imaging lens, and ΣT is a distance from an object side surface of the first lens to an image-forming surface.

9. The imaging lens of claim 1, wherein the imaging lens meets a conditional expression of 20<V2<30.

10. A camera module comprising a filter and the imaging lens recited in claim 1.

11. An imaging lens, comprising in an ordered way from an object side:
a first lens having positive (+) refractive power;
a second lens having negative (−) refractive power;
a third lens having negative (−) refractive power; and
a fourth lens having negative (−) refractive power;
wherein the second lens is convexly formed at an object side surface, and
wherein the imaging lens meets conditional expressions of:
a) 10<[(V1+V3)/2−V2]<20 and V3<30, and b) 10<[(V1+V4)/2−V2]<20 and V4<30; where V1, V2, V3, and V4 are Abbe's numbers of the first to fourth lenses, respectively.

12. The imaging lens of claim 11, wherein the imaging lens meets a conditional expression of −0.5<f/f3<0 and −0.5<f/f4<0, where f is an entire focus distance of the imaging lens, f3: is a focus distance of the third lens, and f4 is a focus distance of the fourth lens.

13. The imaging lens of claim 11, wherein an object side surface of the first lens is convexly formed.

14. The imaging lens of claim 11, wherein the first lens takes a meniscus form convexly formed at an object side surface or is convexly formed at both sides.

15. The imaging lens of claim 11, wherein the third lens is convexly formed at an image side surface, and takes a meniscus form.

16. The imaging lens of claim 11, wherein the fourth lens is convexly formed at an object side surface, and takes a meniscus form.

17. The imaging lens of claim 11, wherein the imaging lens meets a conditional expression of $20 < V2 < 30$.

* * * * *